(12) United States Patent
Vishkin

(10) Patent No.: US 6,542,918 B1
(45) Date of Patent: Apr. 1, 2003

(54) PREFIX SUMS AND AN APPLICATION THEREOF

(75) Inventor: Uzi Vishkin, Netanya (IL)

(73) Assignee: Ramot at Tel Aviv University Ltd., Tel Aviv (IL)

( * ) Notice: Subject to any disclaimer, the term of this patent is extended or adjusted under 35 U.S.C. 154(b) by 0 days.

(21) Appl. No.: 09/224,104

(22) Filed: Dec. 31, 1998

Related U.S. Application Data

(63) Continuation of application No. 08/757,604, filed on Nov. 29, 1996, which is a continuation-in-part of application No. 08/667,554, filed on Jun. 21, 1996, now abandoned.

(51) Int. Cl.[7] ................................................. G06F 7/50
(52) U.S. Cl. ........................................................ 708/670
(58) Field of Search ................................. 708/670–671, 708/490

(56) References Cited

U.S. PATENT DOCUMENTS 4,700,325 A  *  10/1987  Ware .......................... 708/670
4,922,415 A  *  5/1990  Hemdel ....................... 711/206
5,781,465 A  *  7/1998  Lutz et al. ................... 708/671

* cited by examiner

*Primary Examiner*—Tan V. Mai
(74) *Attorney, Agent, or Firm*—Mark M. Friedman

(57) ABSTRACT

A method for performing prefix sums, by including a prefix sum instruction in the instruction set of a microprocessor. Both general prefix summation, base-zero prefix summation and base-zero suffix summation are included in the scope of the present invention. The prefix sum instruction may be implemented in software, using the instructions of existing instruction sets, or may be implemented in dedicated hardware, for example, as a functional unit of a microprocessor. The hardware implementation is suitable for application to the allocation of computational resources among concurrent tasks. The scope of the present invention includes one such application: guaranteeing conflict-free access to multiple single-ported register files.

26 Claims, 3 Drawing Sheets

| CYCLE # | 1 | 2 | 3 | 4 | 5 |
|---|---|---|---|---|---|
| INITIAL COUNTER |  | 5 | 5 | 6 | 0 |
|  | p |  | p | s | t |
|  | q |  | q |  | u |
|  | r |  | r |  |  |
|  | s |  |  |  |  |
|  | t |  |  |  |  |
|  | u |  |  |  |  |

Fig. 2

| CYCLE # | 1 | 2 | 3 | 4 | 5 |
|---|---|---|---|---|---|
| FINAL COUNTER | | 5 | 8 | 1 | 2 |
| | STORE p IN R6 | | FETCH p FROM R6 | FETCH s FROM R7 | FETCH t FROM R1 |
| | STORE q IN R7 | | FETCH q FROM R7 | | FETCH u FROM R2 |
| | STORE r IN R8 | | FETCH r FROM R8 | | |
| | STORE s IN R7 | | | | |
| | STORE t IN R1 | | | | |
| | STORE u IN R2 | | | | |

Fig. 3

PREFIX SUMS AND AN APPLICATION THEREOF

This is a continuation of U.S. patent application Ser. No. 08/757,604, filed Nov. 29, 1996, which is a continuation in part of U.S. patent application Ser. No. 08/667,554, filed Jun. 21, 1996, now abandoned.

FIELD AND BACKGROUND OF THE INVENTION

The present invention relates to computer architecture and, more particularly, to a method for computing prefix sums and the application of the method to allocating computational resources to concurrently executable tasks, for example, ensuring conflict-free access to multiple single-ported register files.

The definition of a prefix sum is as follows: given an input base, x, and an input array y of k elements, $y_1$ through $y_k$, the prefix sum of the base and the array is an output array, of k+1 elements, whose elements are:

$$z_0 = x$$

$$z_1 = x + y_1$$

$$z_2 = x + y_1 + y_2$$

$$\ldots$$

$$z_k = x + y_1 + y_2 + \ldots + y_k$$

The latest generation of computer processors is capable of overlapping the performance of several instructions, and even of issuing several instructions per clock cycle. These instructions may belong to one or several "computational threads". Methods known to the art for coordination among instructions include scoreboarding and Thomasulo's algorithm for uniprocessors, used primarily to efficiently enforce precedence among performed instructions; and "fetch and add" for multiprocessors. These methods are described in standard references, such as "Computer Architecture, a Quantitative Approach", by John L. Hennessy and David A. Patterson, and "Highly Parallel Computing", by George S. Almasi and Allan Gottlieb. As the instruction level parallelism of uniprocessors increases, some of the coordination efforts needed on uniprocessors will begin to somewhat resemble those needed on multiprocessors. A sufficiently low-level implementation of prefix summation would be a valuable additional tool for coordinating multiple instructions from a single thread or from multiple computational threads, as well as being a useful primitive operation for higher-level applications to use. It would be highly advantageous to have both a low level implementation of prefix summation and methods of coordinating multiple computational threads that exploit such an implementation.

SUMMARY OF THE INVENTION

According to the present invention there is provided a method for performing a prefix sum of a base and an input array including at least one input element, comprising the step of providing a prefix sum instruction in an instruction set architecture of a microprocessor.

According to the present invention, there is provided a method for performing a base-zero prefix sum of an array including at least one element, comprising the step of providing a base-zero prefix sum instruction in an instruction set architecture of a microprocessor.

According to the present invention, there is provided a method for performing a base-zero suffix sum of an array including at least one element, comprising the step of providing a base-zero prefix sum instruction in an instruction set architecture of a microprocessor.

According to the present invention, there is provided a functional unit for performing the prefix sum of a base and an input array including at least one input element, comprising: (a) a first logical unit, for performing a base-zero prefix sum of the input array, thereby providing a first intermediate array including at least one element, one of the at least one element being a last element; and (b) a second logical unit, for performing a base-zero suffix sum of the input array, thereby providing a second intermediate array including at least one element.

According to the present invention, there is provided a method of providing conflict-free access to a plurality of register files for a plurality of computational cycles, each of the computational cycles requiring access to at least one value having an ordinal number, there being a largest of the at least one ordinal number, each of the computational cycles having a counter, the method comprising the steps of: for each computational cycle: for each value, adding the counter to the ordinal number, thereby providing a serial number; thereby providing, for each computational cycle, a largest serial number.

To date, no microprocessor has included a prefix sum instruction in its instruction set architecture. The present invention is precisely that: the inclusion of a prefix sum instruction in the instruction set architecture. Such an instruction is expressed in instruction code using syntax of the form $$PSR_iR_j.$$

Here, "PS" is the instruction name, and $R_i$ and $R_j$ are registers. One PS instruction by itself adds the value in register $R_i$ to the value in register $R_j$, returns the result to register $R_i$, and stores the original value of $R_i$ in $R_j$. Any other syntax having the same meaning, and including an instruction label field and at least two operand fields, may be used instead. In and of itself, this instruction has an effect similar to that of an "add" instruction. The difference between the PS instruction and an "add" instruction is that several PS instructions may be cascaded into a multiple-PS instruction: for example, the sequence of instructions $$PSR_0R_1$$

$$PSR_0R_2$$

$$PSR_0R_3$$

$$\ldots$$

$$PSR_0R_k$$

performs the prefix sum of the input base, stored in register $R_0$, and the input array, stored in registers $R_1$ through $R_k$. Upon completion of this sequence of instructions, register $R_1$ contains the value originally stored in $R_0$; register $R_2$ contains the sum of the values originally stored in registers $R_0$ and $R_1$; register $R_3$ contains the sum of the values originally stored in registers $R_0$ through $R_2$; and so on until register $R_k$, which contains the sum of the values originally stored in registers $R_0$ through $R_{k-1}$. Finally, $R_0$ contains the sum of all the values originally stored in all k+1 registers $R_0$ through $R_k$. The microprocessor, through static analysis and dynamic analysis, and through permuting the order of instructions, recognizes a plurality of consecutive single PS instructions, which can comprise a multiple-PS instruction without changing the semantics of the original code. The PS instructions then are decoded collectively as a prefix summation, if possible replacing groups of two or more consecutive single PS instructions by multiple-PS instructions (the allowed multiplicity in a multiple-PS instruction may vary greatly among microprocessors whose instruction set architecture includes a prefix sum).

Prefix summation may be implemented using the instructions of existing instruction sets, for example as a balanced binary tree. Balanced binary tree algorithms for prefix summation are well-known in the art, being presented, for example, in Joseph $J_JJ_J$, "An Introduction to Parallel Algorithms", pp. 43–49, which is incorporated by reference for all purposes as if fully set forth herein. Preferred embodiments of the present invention, however, implement prefix summation in hardware, so that short prefix summations may be completed within one clock cycle and therefore used, for example, for the allocation of computational resources to concurrent tasks, including the allocation of memories and functional units, and including load balancing among tasks coming from single or multiple computational threads. For example, suppose there are three computational threads, each needing three independent adders for its next three instructions, suppose that there are five computational units that can serve as adders, and suppose that each addition requires one clock cycle. Prefix sums may be used to assign unique serial numbers to the instructions so that the adders can be allocated to the instructions and the nine additions completed in two clock cycles. Note that in this application it does not matter in which order the elements of the prefix sum output array are computed.

In a microprocessor configured to do more than one prefix sum concurrently, the two register fields of the prefix sum instruction can serve to indicate to the microprocessor that several prefix sums are to be done in parallel. Specifically, if two or more different values appear in the base field of cascaded PS instructions, and the sets of values in the array field associated with the various base values are disjoint, then each base value is associated with a different prefix sum, and all the prefix sums, being mutually independent, are performed concurrently.

The scope of the present invention also includes two special case of prefix summation. The first special case is the case of a "base-zero" prefix sum, in which the input base x is hardwired to zero. The second special case is the case of a base-zero suffix sum. This is the same as a base-zero prefix sum, except that the elements of the input array are subtracted from zero, in reverse order. In other words, the base-zero suffix sum of an input array y of k elements, $y_1$ through $y_k$, is an output array z, of k+1 elements, whose elements are:

$z_0=0$ $z_1=-y_k$ $z_2=-y_k-y_{k-1}$

. . .

$z_{k-1}=-y_k-y_{k-1}- \ldots -y_2$ $z_k=-y_k-y_{k-1}- \ldots -y_2-y_1$

The preferred instruction for a base-zero prefix sum is expressed in instruction code using syntax of the form $BZPSR_i$.

Here, "BZPS" is the instruction name, and $R_i$ is a register. Note that because the input base is fixed at zero, only one register field is needed in the instruction. Any other syntax having the same meaning, and including an instruction label field and at least one operand field, may be used instead. A single base-zero prefix sum instruction has an effect similar to a no-op: adding zero to the number stored in the register. Like the general prefix sum instruction, the base-zero prefix sum instruction acquires significance when it is cascaded: for example, the sequence of instructions $BZPSR_1$ $BZPSR_2$ $BZPSR_3$

. . .

$BZPSR_k$ performs the base-zero prefix sum of the input array stored in registers $R_1$ through $R_k$. Upon completion of this sequence of instructions, register $R_1$ contains the value originally stored therein; register $R_2$ contains the sum of the values originally stored in registers $R_1$ and $R_2$; register $R_3$ contains the sum of the values originally stored in registers $R_1$ through $R_3$; and so on until register $R_k$, which contains the sum of all the values originally stored in all k registers $R_1$ through $R_k$.

The preferred instruction for a base-zero suffix sum is expressed in instruction code using a syntax analogous to the syntax of the base-zero prefix sum:

$BZSSR_i$.

As in the case of the base-zero prefix sum, the base-zero suffix sum acquires significance only when it is cascaded.

A hybrid syntax is used to indicate that a suitably configured microprocessor is to perform several base-zero prefix sums in parallel. This syntax is of the form $BZPSI_iR_j$.

Here, "BZPS" is the instruction name, $I_i$ is an index, and $R_j$ is a register. As before, any other syntax having the same meaning, and including an instruction label field and two operand fields, may be used instead. In cascaded two-operand BZPS instructions, the register fields indicate the registers holding the array elements to be summed, and the indices are used to distinguish between the different independent base-zero prefix sums.

As in the case of general prefix summation, the microprocessor, through static analysis and dynamic analysis, and through permuting the order of the instructions, recognizes a plurality of consecutive single BZPS instructions, which can comprise a multiple-BZPS instruction without changing the semantics of the original code. The BZPS instructions are decoded collectively as a base-zero prefix summation, if possible replacing groups of two or more consecutive single BZPS instructions by multiple-BZPS instructions. The preferred implementation of base-zero prefix summation is as a balanced binary tree in dedicated hardware.

The scope of the present invention also includes the application of prefix summation to a particular aspect of the coordination of multiple computational threads, that of guaranteeing conflict-free access to multiple single-ported register files, that is, making sure that different reads and writes to the same register files do not occur simultaneously.

B. R. Rau. C. D. Glaeser, and R. L. Picard ("Efficient code generation for horizontal architectures: compiler techniques and architectural support", Proc. ISCA, pp. 131–139, 1982) use scratch pad register files for this purpose. In their approach, finding a viable schedule of operations depends on assigning each temporary value to a scratch pad in a way which is conflict-free. This is done by first forming "maximal compatibility classes" (MCCs), whereby two values are "compatible" if they are neither both read nor both written during the same cycle. All members of an MCC may be assigned to the same scratch pad. A "cover" is a set of MCCs whose union includes all the values that must be assigned. If the number of MCCs in a cover does not exceed the number of scratch pads, conflict-free access is guaranteed by assigning all the values in one MCC to the same scratch pad.

A solution that requires a large number of registers was implemented by G. R. Beck, D. W. L. Yen, and T. L. Anderson ("The Cydra 5 minisupercomputer: architecture and implementation", The Journal of Supercomputing, vol. 7 pp. 143–180, 1993) and by J. C. Dehnert and R. A. Towle ("Compiling for the Cydra 5", The Journal of Supercomputing, vol. 7 pp. 181–228, 1993) in the Cydra 5 using a context register matrix, in which each functional unit has a dedicated row for writes, and each row can be read in parallel by each functional unit through a designated column. This structure permits conflict-free register reads and writes for every functional unit. A similar approach (S. P. Song, M. Denman, and J. Chang, "The PowerPC 604 RISC microprocessor", IEEE Micro, vol. 14 no. 5 pp. 8–17, October 1994) is taken in the current generation of superscalar processors.

The method of the present invention for guaranteeing conflict-free access uses substantially less storage hardware than the context register matrix solution. The context register matrix solution requires a number of registers proportional to the square of the number of functional units and storage of multiple copies of variables. The method of the present invention requires only a number of registers proportional to the number of functional units. Furthermore, each scratch pad needs only one read port and only one write port. The method of the present invention works by allowing values to move among the scratch pads. In each clock cycle, all the values which are used reside in different scratch pads. However, to be useful, the method of the present invention requires a priori knowledge: in which future step will a value just read or updated be needed? In addition, the scope of the method of the present invention does not include communication hardware.

BRIEF DESCRIPTION OF THE DRAWINGS

The invention is herein described, by way of example only, with reference to the accompanying drawings, wherein:

FIG. 2 is an example of the method of guaranteeing conflict-free access, applied to a four-cycle time horizon, showing the initial state;

FIG. 3 is an example of the method of guaranteeing conflict-free access, applied to a four-cycle time horizon, showing the result of applying the method.

DESCRIPTION OF THE PREFERRED EMBODIMENTS

Figure 1:
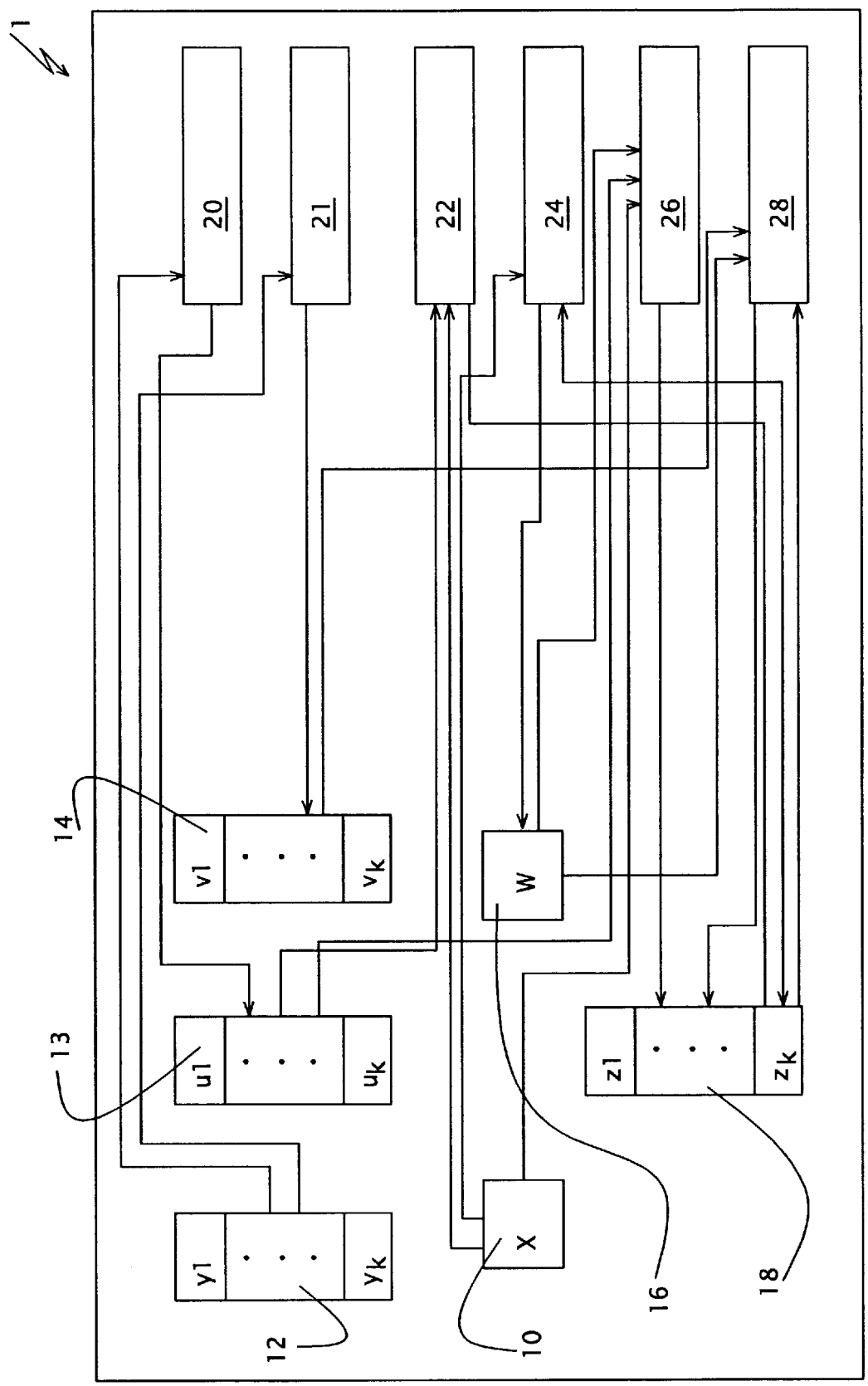
FIG. 1 is a schematic diagram of a prefix sum functional unit.

The present invention is of a prefix summation implemented as an instruction in the instruction set of a microprocessor. Specifically, the present invention can be used, either as an instruction in its own right, or as a part of methods for allocating resources to concurrent tasks, for example, coordinating multiple computational threads.

The principles and operation of a prefix sum instruction according to the present invention may be better understood with reference to the accompanying description and the drawings.

As noted above, in preferred embodiments of the present invention, prefix summation is implemented using dedicated hardware, so that "short" prefix summations may be completed within one clock cycle. The input array often can be reduced to one or more short arrays of small integers (for example, between 0 and 3), especially in applications of prefix summation to load balancing, allocation of resources to tasks, including task scheduling, and thread coordination. In that case, one preferred hardware implementation of multiple prefix summation is as follows:

1. Compute the base-zero prefix sum of all the input elements $y_i$, using dedicated hardware. This dedicated hardware can be based on an implementation using binary balanced trees. Store this prefix sum in a first intermediate array u of k elements, $u_1$ through $u_k$.
2. Compute the last output element $z_k$ by adding the last intermediate element $u_k$ to the input base x, using an adder.
3. Compute the base-zero suffix sum of all the input elements $y_i$, using dedicated hardware. As in the case of the base-zero prefix sum, this dedicated hardware can be based on an implementation using binary balanced trees. Store this suffix sum in a second intermediate array v of k elements, $v_1$ through $v_k$.

The rest of the prefix sums, $z_1$ through $z_{k-1}$, are found by using arithmetic on only a small number of bits, either by additions of elements of intermediate array u to the input element x or by subtractions of elements of intermediate array v from $z_k$. These additions and subtractions are based on first determining the index, i, of the most significant bit at which x and $z_k$ differ, and constructing an auxiliary number, w, which has one in its i-th bit, has zeroes in all bits less significant than the i-th bit, and is identical to both x and $z_k$ in all bits more significant than the i-th bit. Thus, w is greater than x and less than $z_k$. The remaining steps of this preferred hardware implementation are as follows:

4. Find index i as follows: Apply exclusive-or bitwise to the binary representations of x and $z_k$. i is the index of the most significant bit for which this exclusive-or yields a one.
5. Derive w.
6. Get the values of the rest of the output array which are smaller than w by adding the low-index elements of intermediate array u to x.
7. Get the values of the rest of the output array which are equal to or greater than w by subtracting the high-index elements of intermediate array v from $z_k$.

Because the input array is short and all the input array elements are small integers, the additions and subtractions of steps 6 and 7 involve only short carries. Therefore, they are implemented using look-ahead carry generators. Look-ahead carry generators are described in M. Morris Mano, "Digital Logic and Computer Design", pp. 154–161, which is incorporated by reference for all purposes as if fully set forth herein.

It will be clear to one ordinarily skilled in the art how to implement these seven steps of multiple prefix summation in hardware. Referring now to the Figures, FIG. 1 shows a schematic diagram of a functional unit 1 of a microprocessor that performs multiple prefix summation in this manner.

Functional unit 1 includes registers 10, 12, 13, 14, 16, and 18, and logic units 20, 21, 22, 24, 26, and 28. Register 10 is used to store input base x. Registers 12 are used to store the elements of input array y. Registers 13 are used to store the elements of intermediate array u. Registers 14 are used to store the elements of intermediate array v. Register 16 is used to store auxiliary value w. Registers 18 are used to store the elements of output array z. Logic unit 20 performs the base-zero prefix sum of step 1, preferably implemented as a balanced binary tree. Logic unit 21 performs the base-zero suffix sum of step 3, preferably implemented as a balanced binary tree. Logic unit 22 is an adder, for performing step 2. Logical unit 24 performs steps 4 and 5. Logical unit 26 performs step 6. Logical unit 28 performs step 7. The arrows in FIG. 1 indicate the flow of data among registers 10, 12, 13, 14, 16, and 18 and logical units 20, 21, 22, 24, 26, and 28.

Logical units 26 and 28 are specialized adders because they do not require long carries. Their operations may be performed concurrently. Logical unit 26 supports concurrent addition, and logical unit 28 supports concurrent subtraction.

The scope of the present invention also includes a method for guaranteeing conflict-free access to registers in separate single-ported register files. The method looks ahead at a time horizon of h forthcoming cycles. Values used in the current cycle that are known to be needed again within h cycles are directed to register files. Other values are stored in other, slightly slower memories. Once a cycle is executed, the time horizon is shifted forward one cycle.

The present invention assigns to each value a unique serial number with respect to all the other values that will be needed in the same future cycle. That serial number is the number of the register file in which the value is stored. Because the serial number is unique, no two values in any cycle come from the same register file.

Each of the h forthcoming cycles has a counter which maintains the number of values that have already been allocated to that cycle. Upon the completion of a cycle, more values are allocated among the forthcoming cycles. Each value to be allocated to a given cycle is associated with an ordinal number: if the m values $x_1$ through $x_m$ are to be allocated to a cycle, then their ordinal numbers are their indices 1 through m. Each value's serial number is the sum of the cycle's counter and that value's ordinal number. Finally, the counter is updated by replacing it with the "largest" serial number, i.e., the serial number obtained by adding the largest ordinal number to the counter. It is to be understood that the results of all these additions do not exceed the number of register files.

FIGS. 2 and 3 illustrate an example of the method of the present invention, applied to a time horizon of four cycles. For simplicity, it is assumed that every instruction fetches a value of a single operand, does some processing, and stores a value back, all within one cycle.

FIG. 2 shows that the values p, q, r, s, t, and u are stored by six instructions during cycle 1. The object of the method of the present invention is to store these values to guarantee conflict-free access to p, q, and r in cycle 3, to s in cycle 4, and to t and u in cycle 5. The initial values of the counters are 5, 5, 6, and 0 for cycles 2, 3, 4, and 5 respectively. Cycle 5 has a counter of 0 because it is the cycle that has just entered the time window.

Cycle 2 requires no values from cycle 1, so the counter of cycle 2 remains 5. The ordinal numbers of values p, q, and r with respect to cycle 3 are 1, 2, and 3, respectively. Therefore, the serial numbers of values p, q, and r are 6, 7, and 8 respectively. Value s, being the only value transferred from cycle 1 to cycle 4, has the ordinal number 1, so the serial number of value s is 7. The ordinal numbers of values t and u are 1 and 2, respectively. Therefore, the serial numbers of t and u are 1 and 2, respectively. The final values of the counters of cycles 2, 3, 4, and 5 are 5, 8, 7, and 2 respectively. As shown in FIG. 3, the method of the present invention causes cycle 1 to store value p in register file 6, value q in register file 7, value r in register file 8, value s in register file 7, value t in register file 1, and value u in register file 2. Cycle 3 fetches value p from register file 6, value q from register file 7, and value r from register file 8. Cycle 4 fetches value s from register file 7. Cycle 5 fetches value t from register file 1 and value u from register file 2. It does not matter that both value q and value s are stored in the same register file, as long as both value q and value s are stored in the right order, because they are fetched in different cycles.

The computations of the serial numbers are most efficiently implemented as prefix sums. Specifically, for each forthcoming cycle, the base is the initial value of the counter, and the input array is an array of ones having as many elements as there are values directed to that cycle. These prefix sums are most efficiently implemented in hardware as described above, to enable them to be performed within one cycle. If necessary, as in a balanced binary tree implementation, the input array is padded with zeros to give it a length equal to a power of two. Because the input elements are either one or zero, the input array is most efficiently implemented as a binary array, with one bit per value.

While the invention has been described with respect to a limited number of embodiments, it will be appreciated that many variations, modifications and other applications of the invention may be made.

What is claimed is:

1. A method for performing a prefix sum of a base and an input array including a plurality of input elements, comprising the steps of:

(a) providing a prefix sum instruction in an instruction set architecture of a microprocessor;

(b) cascading said prefix sum instruction; and (c) decoding said cascaded prefix sum instruction collectively as a prefix summation.

2. The method of claim 1, wherein said prefix sum instruction is expressed in instruction code using at least one statement including an instruction label field and at least two operand fields.

3. The method of claim 1, wherein said prefix sum instruction is implemented as a balanced binary tree.

4. The method of claim 3, wherein said balanced binary tree is implemented in dedicated hardware.

5. The method of claim 1, wherein said collective prefix summation is implemented using steps including:

(a) prefix summing the input array, thereby providing a first intermediate array including a plurality of elements, one of said plurality of elements being a last element;

(b) suffix summing the input array, thereby providing a second intermediate array including a plurality of element;

(c) adding said last element of said first intermediate array to the base, thereby providing a last output element;

(d) adding to the base each member of a subset of said plurality of elements of said first intermediate array; and (e) subtracting from said last output element each member of a subset of said plurality of elements of said second intermediate array.

6. The method of claim 5, wherein:
(a) said step of prefix summing the input array is performed using a first dedicated hardware;
(b) said step of suffix summing the input array is performed using a second dedicated hardware;
(c) said step of adding to the base said last element of said first intermediate array is performed using an adder;
(d) said step of adding to the base each member of a subset of said plurality of elements of said first intermediate array is performed using a third dedicated hardware; and
(e) said step of subtracting from said last output element each member of a subset of said plurality of elements of said second intermediate array is performed using a fourth dedicated hardware.

7. The method of claim 6, wherein each of said first dedicated hardware and said second dedicated hardware is implemented as a balanced binary tree.

8. The method of claim 6, wherein each of said third dedicated hardware and said fourth dedicated hardware includes at least one look-ahead carry generator.

9. The method of claim 5, further including the step of selecting an auxiliary number between the base and said last output element, wherein said subset of said plurality of elements of said first intermediate array is characterized by having sums with the base that are less than said auxiliary number, and where said subset of said plurality of elements of said second intermediate array is characterized by having sums with the base that are at least as great as said auxiliary number.

10. The method of claim 9, wherein said step of selecting an auxiliary number is performed using a fifth dedicated hardware.

11. A method for performing a base-zero prefix sum of an array including a plurality of elements, comprising the steps of;
(a) providing a base-zero prefix sum instruction in an instruction set architecture of a microprocessor;
(b) cascading said base-zero prefix sum instruction; and
(c) decoding said cascaded prefix sum instruction collectively as a base-zero prefix summation.

12. The method of claim 11, wherein said base-zero prefix sum instruction is expressed in instruction code using at least one statement including an instruction label field and at least one operand field.

13. The method of claim 12, wherein said base-zero prefix sum instruction is expressed in instruction code using at least one statement including an instruction label field and at least two operand fields.

14. The method of claim 11, wherein said base-zero prefix sum instruction is implemented as a balanced binary tree.

15. The method of claim 14, wherein said balanced binary tree is implemented in dedicated hardware.

16. A method for performing a base-zero suffix sum of an array including a plurality of elements, comprising the steps of:
(a) providing a base-zero suffix sum instruction in an instruction set architecture of a microprocessor;
(b) cascading said base-zero suffix sum instruction; and
(c) decoding said cascaded suffix sum instruction collectively as a suffix summation.

17. The method of claim 16, wherein said base-zero suffix sum instruction is expressed in instruction code using at least one statement including an instruction label field and at least one operand field.

18. The method of claim 16, wherein said base-zero suffix sum instruction is implemented as a balanced binary tree.

19. The method of claim 18, wherein said balanced binary tree is implemented in dedicated hardware.

20. A functional unit for performing the prefix sum of a base and an input array including a plurality of input elements, comprising:
(a) a first logical unit, for performing a base-zero prefix sum of the input array, thereby providing a first intermediate array including a plurality of elements, one of said plurality of elements being a last element;
(b) a second logical unit, for performing a base-zero suffix sum of the input array, thereby providing a second intermediate array including a plurality of elements
(c) a first plurality of registers for storing the input array;
(d) a second plurality of registers for storing said first intermediate array; and
(e) a third plurality of registers for storing said second intermediate array.

21. The functional unit of claim 20, wherein said first logical unit and said second logical unit are implemented as balanced binary trees.

22. The functional unit of claim 20, further comprising:
(f) a third logical unit, for adding to the base said last element of said first intermediate array, thereby providing a last output element;
(g) a fourth logical unit, for adding to the base each member of a subset of said plurality of elements of said first intermediate array; and
(h) a fifth logical unit, for subtracting from said last output element each member of a subset of said plurality of elements of said second intermediate array.

23. The functional unit of claim 22, wherein said third logical unit is an adder.

24. The functional unit of claim 22, wherein said fourth logical unit supports concurrent addition, and wherein said fifth logical unit supports concurrent subtraction.

25. The functional unit of claim 22, further comprising a sixth logical unit, for selecting an auxiliary number used to select said subset of said plurality of elements of said first intermediate array and said subset of said plurality of elements of said second intermediate array.

26. The functional unit of claim 22, wherein said adding to the base of each said member of said subset of said plurality of elements of said first intermediate array produces a first set of at least one output element, and wherein said subtracting from said last output element each member of a subset of said plurality of elements of said second intermediate array produces a second set of at least one output element, the functional unit further comprising:
(i) a fourth plurality of registers for storing the base, said last output element, said first set of at least one output element and said second set of at least one output element.

* * * * *